(12) United States Patent
Mazzone

(10) Patent No.: US 6,325,289 B1
(45) Date of Patent: Dec. 4, 2001

(54) APPARATUS AND PROCESS FOR FOCUSING A LASER BEAM FOR READING OPTICAL CODES

(75) Inventor: Claudio Mazzone, Crespellano (IT)

(73) Assignee: Datalogic S.p.A., Bologna (IT)

( * ) Notice: Subject to any disclaimer, the term of this patent is extended or adjusted under 35 U.S.C. 154(b) by 0 days.

(21) Appl. No.: 09/219,764

(22) Filed: Dec. 23, 1998

(30) Foreign Application Priority Data

Dec. 24, 1997 (EP) .................................................. 97830714

(51) Int. Cl.$^7$ ...................................................... G06K 7/10

(52) U.S. Cl. ................ 235/462.14; 235/462.23; 235/462.22

(58) Field of Search ........................... 235/462.4, 462.22, 235/462.23, 462.32, 462.42, 383, 437, 455, 459, 472.01, 462.14; 359/201; 250/234

(56) References Cited

U.S. PATENT DOCUMENTS

| | | | |
|---|---|---|---|
| 5,000,529 | * 3/1991 | Katoh et al. | 250/236 X |
| 5,308,960 | * 5/1994 | Smith et al. | 235/454 |
| 5,426,288 | 6/1995 | Obata et al. | 235/455 X |
| 5,483,051 | * 1/1996 | Marchi | 235/462.4 X |
| 5,679,941 | * 10/1997 | Iizaka et al. | 235/383 |
| 5,693,930 | * 12/1997 | Katoh et al. | 235/462.4 X |
| 5,979,761 | * 11/1999 | Wurz et al. | 235/454 |
| 6,053,409 | * 4/2000 | Brobst et al. | 235/462.36 |

FOREIGN PATENT DOCUMENTS 0 394 072A   10/1990   (EP) .
WO97 33247   9/1997    (WO) .

* cited by examiner

*Primary Examiner*—Karl D. Frech
*Assistant Examiner*—Daniel St. Cyr
(74) *Attorney, Agent, or Firm*—Sughrue, Mion, Zinn, Macpeak & Seas, PLLC

(57) ABSTRACT

An optical reader which enables optical codes to be read on objects carried on a supporting plane which is provided with a conveyor for moving the objects along a feeding direction. The apparatus comprises a laser beam scanner, a data processing unit connected to the scanner, a first scanner for generating at least a first scan in a first scan plane, so as to measure the instantaneous distance of at least one point on the surface of each of said objects from the scanner, a second scanner for generating a plurality of second scans in a second scan plane, different from the first, so as to read the optical code on the object; and a data processing unit for adjusting the laser beam focal setting according to the distance measured with the first scan.

23 Claims, 4 Drawing Sheets

APPARATUS AND PROCESS FOR FOCUSING A LASER BEAM FOR READING OPTICAL CODES

BACKGROUND OF THE INVENTION

This invention relates to a laser beam focusing apparatus and process for reading optical codes on objects carried on a supporting plane.

Throughout this description and the appended claims, the term "optical code" will be used to indicate a code (such as a bar code, two-dimensional code, color code, or the like) adapted to univocally identify objects bearing that code. In particular, reference will be made to bar codes for convenience of illustration.

Especially in the material handling and sorting plants, there is the problem of enabling the identification and classification of objects, which may differ considerably in height from one another, by means of a single instrument (typically a laser scanner), so as to speed up and optimize the subsequent object sorting and storage operations. In such situations, a fixed optics type of laser scanner not always allows codes to be brought into focus on the objects to be identified.

Further problems are encountered where a fixed optics scanner is used for reading high-resolution bar codes. In this situation, the achievable depth of field sharply decreases with decreasing of the code bars width. For example, with code bars 0.3 mm wide, a depth of field of no more than 300 mm can be achieved, while with code bars 0.2 mm wide, the maximum depth of field achievable is virtually reduced to half.

In practical applications an increased depth of field is required.

Various arrangements have been proposed heretofore for increasing the depth of field of a laser scanner. Best known among these are arrangements based on the multi-laser technique and on the electro-mechanical driving of optical parts effective to focus the laser beam.

Among the known multi-laser systems, that described in U.S. Pat. No. 5,483,051 of the same Applicant is of special interest. This system utilizes a modulated light type of laser scanner associated with two or more laser sources, each adapted to generate scans focused on preset distances. Such a system allows to measure the distance from the scanner of an optical code to be read, and to utilize this information for selecting and activating the one of the laser sources which is focused on that distance.

While obviating the prior art drawbacks, due in particular to the need of providing outside the scanner an array of photocells for measuring the height of the object bearing the bar code, or alternatively, to the need of providing for continuous and sequential activation of all the laser sources until a given scan recognizes the presence of a code, the multi-laser system of the above type has a drawback in that it involves a complicated optical construction and, hence, high costs. Both factors are restrictive of the applicability of such a system to small-size and of limited capacity plants.

The systems based on the electro-mechanical driving of optical parts for focusing the laser beam onto the object are indeed more simple construction-wise and economical to manufacture.

Although substantially achieving their objective, the last-mentioned systems also exhibit a series of drawbacks that have been left without a remedy.

A first drawback is associated with the need of an external height or distance sensor (depending on the mounting position of the scanner relative to the conveyor belt) adapted to drive the movements of the optical parts for focusing the laser beam. The presence of this sensor complicates the system and makes difficult, and some time impossible, the reading of irregularly shaped objects. In fact, the external sensor can only detect the maximum height of the object being conveyed under the reading area. Since the scanner is to focus the optical system based on this information, the error involved is surely high because a significant portion of the working depth of field cannot be utilized as expected, while with objects having an irregular surface shape, focusing will never be optimized.

A further drawback of conventional electro-mechanical driving systems is associated with the high response time of such systems, which makes them unsuitable for high speed applications.

SUMMARY OF THE INVENTION

The underlying technical problem of this invention is to provide an apparatus of simple and economical construction which can focus the optical system correctly and automatically, such that optical codes can be read on objects of any shapes and different heights.

Thus, a first aspect of this invention relates to a laser beam focusing apparatus for reading optical codes on objects carried on a supporting plane which is provided with a means for moving the objects along a feeding direction, comprising:

a laser beam scanner, which scanner is positioned relative to the object supporting plane so as to illuminate the object surface bearing the optical code;

a data processing unit connected to the scanner;

a first scan means for generating at least a first scan in a first scan plane, so as to measure the instantaneous distance of each point on the surface of each of said objects from the scanner;

a second scan means for generating a plurality of second scans in a second scan plane, so as to read the optical code on the object;

a means for adjusting the laser beam focal setting according to the distance measured with the first scan.

This is, therefore, an apparatus with an electro-mechanically driven optics which, additionally to being economical and constructionally simple, is capable of calculating, with high periodicity, the distance to which the code to be read passes and thus of suitably focusing the laser beam for a correctly optimized reading from objects having any shapes and heights.

Preferably, the scanner of the apparatus of the invention is a scanner emitting modulated-light laser.

Compared to conventional apparatus, wherein the electro-mechanical driving is controlled by an external height sensor, the apparatus Of this invention has an electro-mechanical driving controlled by the distance measurement made by emitting the modulated light laser beam. The distance measuring procedure is described in detail in U.S. patent application Ser. No. 5,483,051 of the same Applicant.

With this measuring procedure, the distance from the scanner to the optical code is measured (not the maximum height of the surface bearing the code), and the driving of focusing optical system is controlled on the basis of this information. Thus, the prior art limitations and drawbacks connected with the difficulty and indefiniteness of the distance measurement on irregular surfaces are overcome.

This apparatus also allows, in successive steps corresponding to different focus settings, of achieving a great depth of field in the instance of high-resolution codes, and a continuous focusing onto irregular surfaces.

Advantageously, the second scan plane is different from the first scan plane. Even more advantageously, the first scan plane intercepts the object in advance of the second scan plane, relative to the object movement on the supporting plane along the feeding direction. In this way, the distance of the bar code can be known before the object enters the code reading area, thereby allowing this focusing system to be also used for high-speed applications.

A usual problem encountered in conventional scanners wherein all the beam rays act on the same plane is that the distance is measured simultaneously with the code reading, so that, the electro-mechanical driving system being typically slow, compared to the moving speed of the objects, in driving the optical parts dedicated to focusing the laser beam (typical values of the driving time for focusing the lens are in the 15 to 20 ms range to obtain full shifting in slower and less expensive systems, and may reduce to a few msec in more sophisticated systems), the driving system will bring the movable optical parts into correct position only after the object has entered the reading area, thereby wasting many useful reading scans and greatly restricting the application possibilities.

The apparatus of this invention obviates this drawback by performing the scans dedicated to measuring the distance of the optical code in advance of the scans dedicated to reading the optical code, so that the optical parts can be correctly focused before the objects reach the code reading area.

Advantageously, the first and second scan planes are inclined to each other at an angle in the 20 to 2° range. Even more advantageously, this inclination angle is 6°. At typical values of feeding speed of the conveyor belt, this allows the focusing optical parts to be moved into correct position before the objects enter the code reading area.

Preferably, the first means acts in advance of the second means. In this way, the operation of the apparatus can be optimized such that the read scans will only be activated after the laser beam is correctly focused on the basis of the measured distance value.

In a specially advantageous embodiment, the apparatus of this invention comprises a polygonal mirror-carrying rotor, wherein the first scan means comprises some (m) of the rotor mirrors and the second scan means comprises the remaining (n-m) rotor mirrors, said some of the rotor mirrors having a different inclination from the rotor axis than that of said remaining rotor mirrors. The (m) mirrors set at a different angle of inclination generate distance measuring scans, while the remaining (n-m) mirrors generate optical code reading scans. Thus, the aforementioned scans in two different planes can be performed by means of a single rotor associated with a single laser source.

The number of mirrors for the distance measurement can be changed as desired to vary the wait time before a useful measuring scan can be made, according to the speed of the conveyor belt. In all events, since the distance measurement is not so critical as the code reading, the number of distance measuring mirrors may even be much smaller than the number of code reading mirrors (e.g., 1 out of 10).

The scans in the first and second scan planes are also performed by further embodiments of the apparatus of the invention, all characterized by an extremely simple construction.

In a first alternative embodiment, the apparatus of this invention comprises a polygonal mirror-carrying rotor, wherein the first scan means comprises a plurality of first rotor mirrors mounted around a first peripheral portion of the rotor, and the second scan means comprises a plurality of second rotor mirrors mounted around a second peripheral portion of the rotor adjacent to said first peripheral portion, the mirrors of said plurality of first mirrors having a different inclination from the rotor axis than that of the mirrors of said plurality of second mirrors. This allows a larger number of mirrors to be dedicated to generating the distance measuring scans, thereby significantly reducing the wait time for a useful measuring scan. This makes such a rotor suitable for very high speed applications.

Alternatively, the apparatus of this invention may comprise an oscillating mirror having an oscillation plane movable between two different positions.

Also alternatively, the apparatus of this invention may incorporate a modulated light laser source housed within the scanner and oscillating in a movable plane between two different positions.

A second aspect of this invention relates to a process for focusing a laser beam for reading optical codes on objects which are carried on a supporting plane provided with a means for moving the objects along a feeding direction, comprising the following steps:

a) defining a first scan plane intersecting the supporting plane along a first scan line, said first plane comprising at least one modulated light laser beam;

b) defining a second scan plane, different from the first one, intersecting the supporting plane along a second scan line, said second plane comprising at least one laser beam;

c) performing at least a first scan across the surface of one of said objects by means of the laser beam lying on the first scan plane;

d) processing the data provided by said first scan and calculating the instantaneous distance of at least one point on the surface of said object from a scanner emitting said laser beams;

e) focusing the laser beam lying on the second scan plane according to the calculated distance value.

With the above process, the depth of field of a modulated light laser beam emitting scanner can be adjusted by means of an electro-mechanical driving which is controlled by the measured distance of the optical code to be read.

BRIEF DESCRIPTION OF THE DRAWINGS

Further features and advantages of this invention will be more clearly apparent from the following detailed description of a preferred embodiment thereof, to be read in conjunction with the accompanying drawings. In the drawings:

FIG. 4 is a perspective view of an alternative embodiment of the means shown in FIG. 3a.

DETAILED DESCRIPTION OF THE INVENTION

Figure 1:
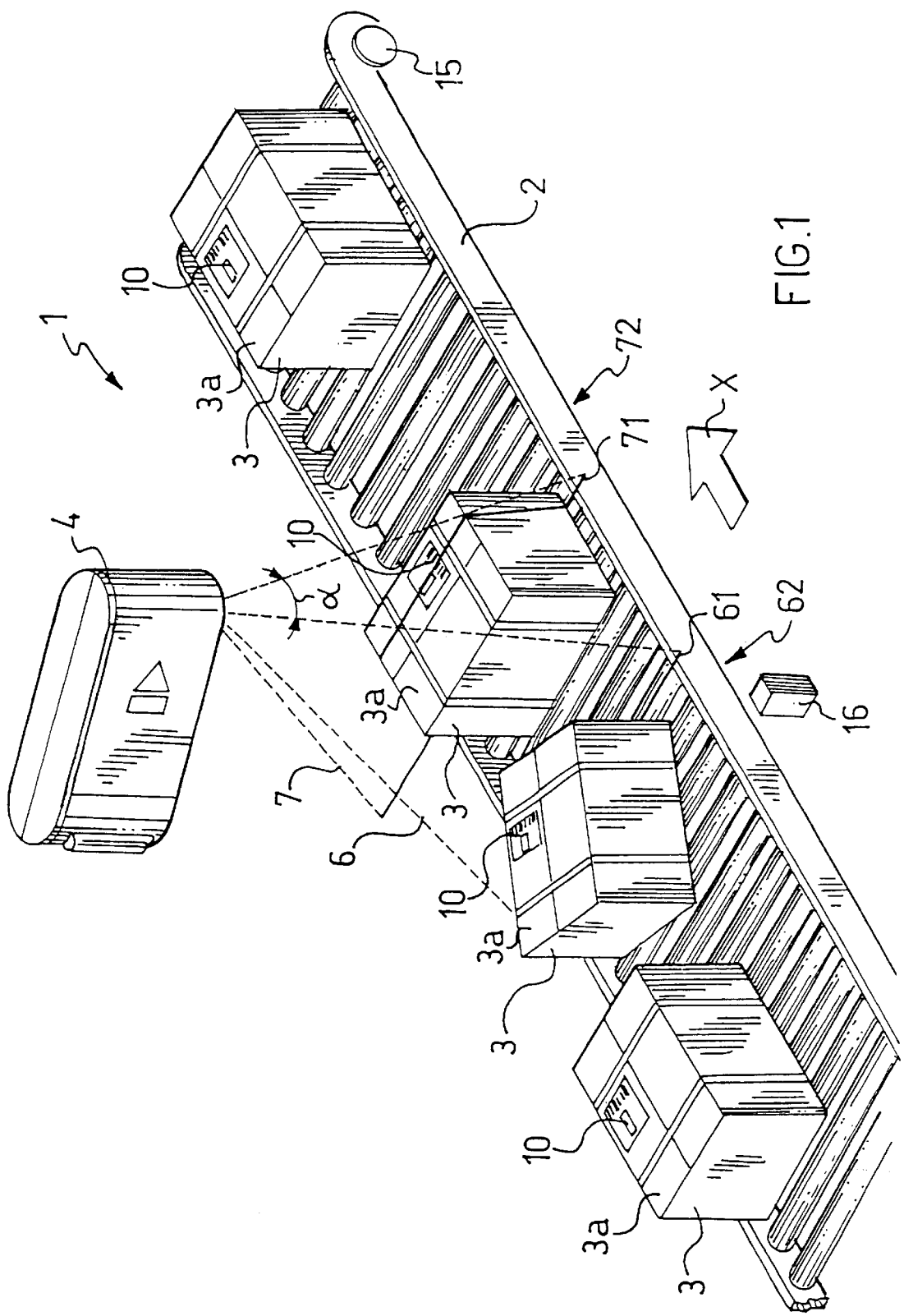
FIG. 1 in a perspective view of an apparatus according to the invention.

In said figures, 1 indicates an apparatus for adjusting the depth of field of an optical code reader. The apparatus 1 comprises a conveyor belt 2 movable along a feeding direction x by a conventional moving means (not shown).

A plurality of objects 3 are placed on the conveyor belt 2 for their identification by reading an optical code 10 provided on a top surface 3a of each object by means of a modulated light laser scanner 4.

The scanner 4 is located above the conveyor belt 2 and has a laser source 5 capable of emitting a modulated light laser beam 51 which sweeps across a first scan plane 6 intersecting the conveyor belt 2 along a first scan line 61, and across a second scan plane 7, offset from the first scan plane 6 by an angle a and intersecting the conveyor belt 2 along a second scan line 71. The angle a is generally within the range of 2° to 20°, preferably a 6° angle.

The first scan line 61 lies within a first working zone 62 of the conveyor belt 2 with respect to the scanner 4. Within this first zone 62, the laser beam 51, acting in the first scan plane 6 through a first means 8 effective to generate first distance measuring scans, is arranged to sweep across the objects 3 for measuring the distances of the objects 3 from the scanner 4.

The second scan line 71 lies within a second working zone 72 of the conveyor belt 2 with respect to the scanner 4. Within this second zone 72, the laser beam 51, acting in the second scan plane 7 through a second means 9 effective to generate second code reading scans, is arranged to sweep across the objects 3 for reading the optical code 10 thereon.

The scans of the laser beam 51 in the first and second scan planes 6 and 7 may be generated by the scanner 4 in different practical ways.

Figure 2:
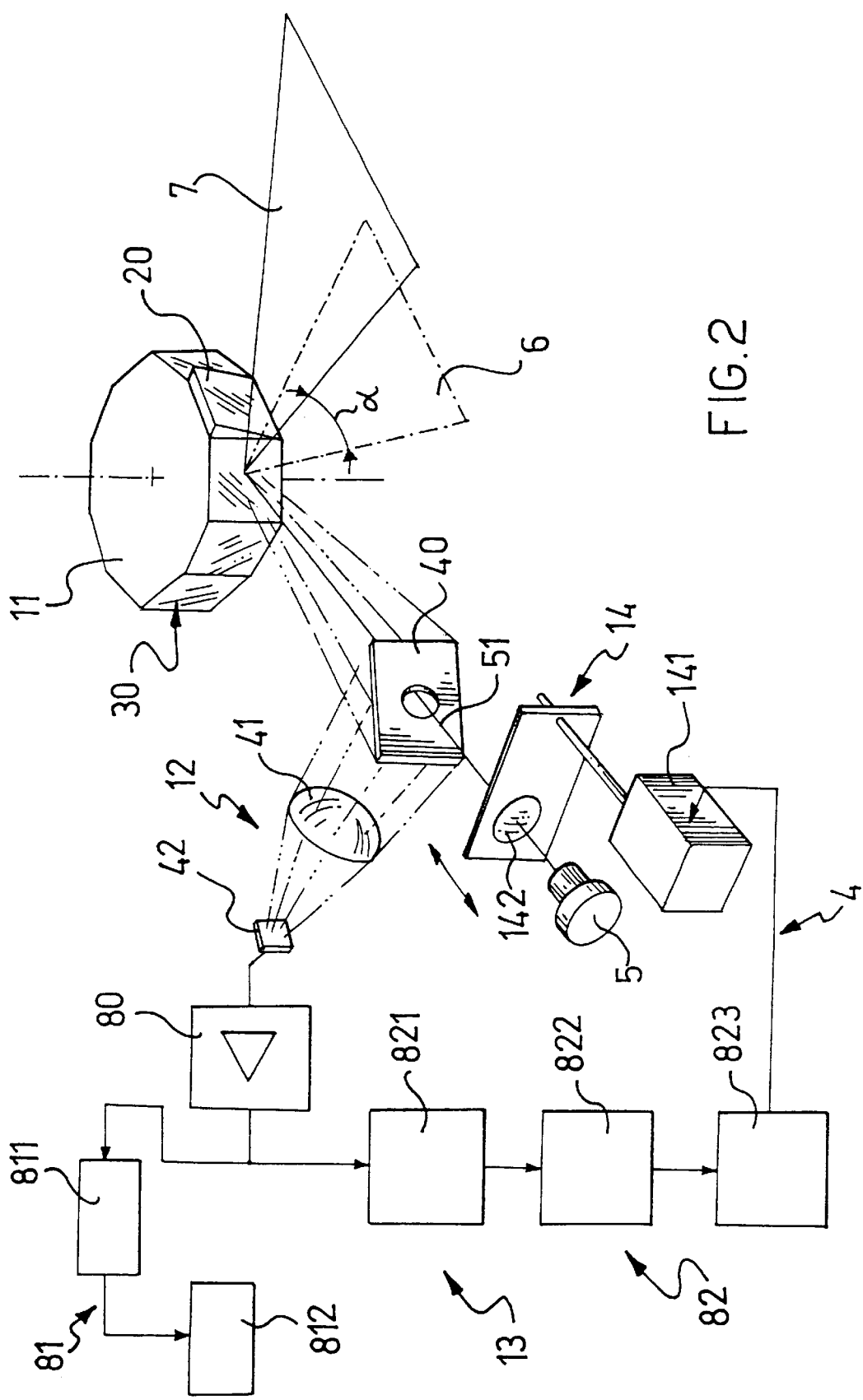
FIG. 2 shows schematically the electro-mechanical driving optical system of the apparatus in FIG. 1.
Figure 3A:
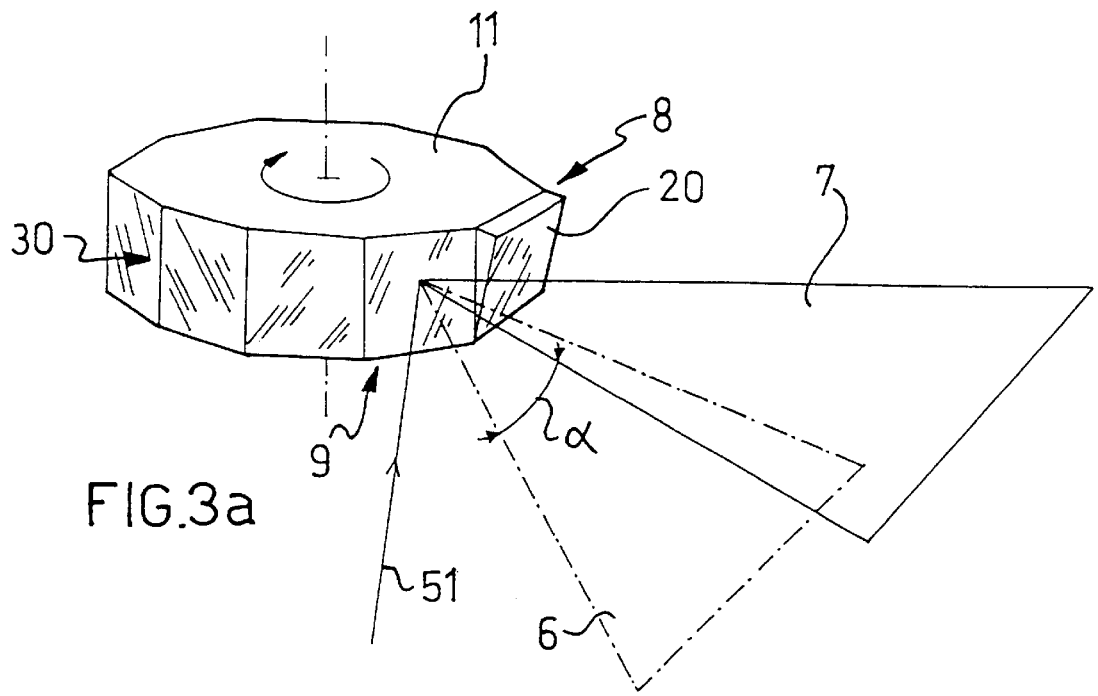
FIG. 3a is a perspective view of a preferred embodiment of the scan generating means of the apparatus in FIG. 1, shown in a first working configuration thereof.
Figure 3B:
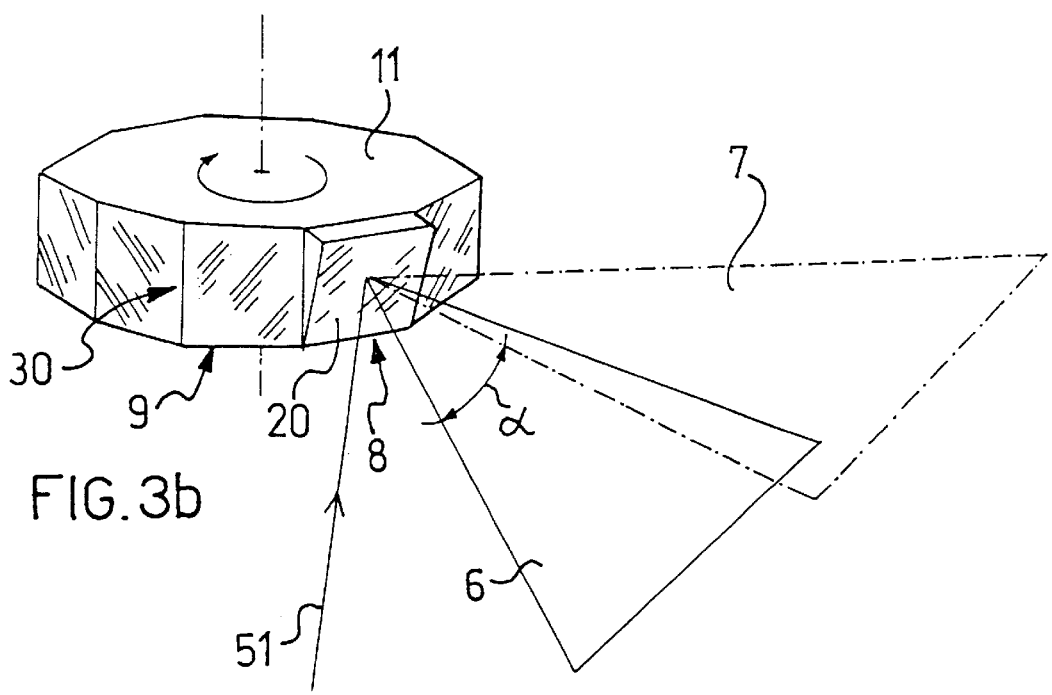
FIG. 3b is a perspective view of the means shown in FIG. 3a, in a second working configuration thereof.

In a preferred embodiment shown in FIGS. 2, 3a and 3b, the apparatus 1 comprises a polygonal mirror-carrying rotor 11 comprising at least a first mirror 20 for generating the scan in the scan plane 6, and a plurality of second mirrors, collectively indicated at 30, which are similarly mounted on the rotor 11 and adapted to generate the scans in the scan plane 7. The mirror 20 is inclined from the axis of the rotor 11 at a different angle than that of the mirrors 30. Typically, since the number of distance measuring scans can be far smaller than the reading scans of the code 10, a rotor may be used which has 10 mirrors of which one, set at a different angle, would be dedicated for the distance measuring scan and the remaining nine mirrors for the reading scan. There may be provided more than one mirror set at a different inclination angle.

Figure 4:
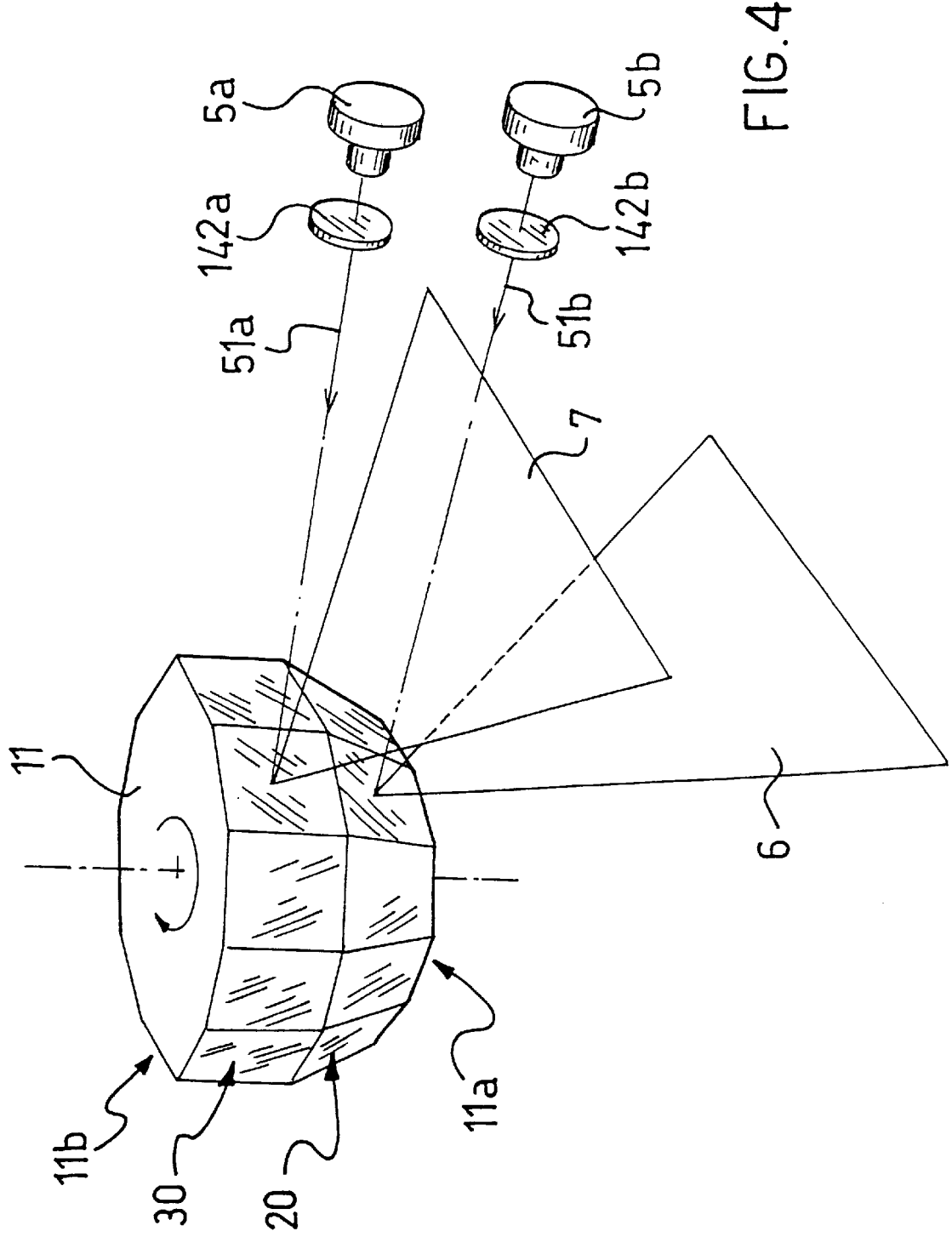

In a first alternative embodiment shown in FIG. 4, the polygonal mirror-carrying rotor 11 comprises a plurality of first mirrors 20 mounted around a first peripheral portion 11a of the rotor 11, and a plurality of second mirrors 30 mounted around a second peripheral portion 11b of the rotor 11 adjacent to the portion 11a. The mirrors 20 are inclined from the rotation axis of the rotor 11 at a different inclination angle than the mirrors 30.

In a second alternative embodiment, not shown, the scans of the laser beam 51 in the first and second scan planes 6 and 7 can be performed by means of an oscillating mirror having an oscillation plane movable between two different positions.

In a third alternative embodiment, not shown, the scans of the laser beam 51 in the first and second scan planes 6 and 7 can be generated from a modulated light laser source 5 housed within the scanner 4 and oscillating in a plane movable between two different positions.

However, further embodiments, not described herein for simplicity, are practicable for generating scans in the first and second scan planes 6 and 7.

The scanner 4 respectively comprises, as shown in FIG. 2, an optical system 12 for throwing back the light beam (originated from the laser beam 51 acting in either scan plane 6 or 7) scattered from the object 3 being swept by the laser beam 51 scans, a processing unit 13 for the data obtained from such scans in the first plane 6 and second scan plane 7, and a means 14 of adjusting the focus and, hence, the depth of field of the laser beam 51 according to the data obtained by the scans in the first plane 6.

In particular, the optical system 12 throwing back the light beam scattered from the object 3 comprises a mirror 40 for picking up the scattered light beam, a converging lens 41 for the picked-up light a and a photodiode 42 adapted to generate an electric signal which is proportional to the light intensity of the picked-up light beam.

The processing unit 13 for the data obtained from scans in the first scan plane 6 and second scan plane 7 comprises an amplifier 80 of the electric signal generated by the photodiode 42, a means 81 for reading the optical code 10 on the object 3, and a means 82 for measuring the distance of the object 3 from the scanner 4.

In particular, the means 81 comprises a digitalizer 811 for the amplified electric signal, and a decoder 812 for decoding the digital signal so as to "read" the optical code 8.

In particular, the means 82 for measuring the distance of the object 3 from the scanner 4 comprises a distance meter 821 (of the type described in U.S. Pat No. 5,483,051 of the same Applicant, for example), an analog-to-digital converter 822, and a microprocessor 823 for processing data acquired from the distance measurement so as to control the driving of the depth of field adjusting-means 14 of the scanner 4.

In particular, this means 14 comprises an actuator 141 acting on a focusing lens 142 to position it as appropriate with respect to the laser source 5.

The actuator 141 may be of any selected type, such as, for example, a step motor, linear actuator, or other types of actuators made with other technologies (e.g. piezo-ceramic actuators, etc.). Of course, the actuator would be selected to suit the specific requirements of the application.

The conveyor belt 2 may be equipped, as shown in FIG. 1, with an encoder 15, that is a device adapted to send a signal to the processing unit 13 each time that the conveyor belt 2 has moved through an predetermined feeding distance.

The conveyor belt may also be provided with an inlet detector 16 effective to send a signal to the processing unit 13 each time that an object 3 enters the working zone 62, thereby to activate the scanner 4.

The apparatus 1 operates as follows. Objects 3 (of any shapes and heights) to be identified by reading their optical codes 10 are loaded onto the conveyor belt 2. The continuous movement of the conveyor along the feeding direction x takes each object 3 to reach the working zone 62 (effective for measuring the distance) located in the proximity of the scanner 4.

The arrival at the zone 62 is signaled in suitable manner whatever (e.g. by a signal generated from the inlet detector 16) to the processing unit 13; the latter activates the scanner 4, which will start to perform a plurality of scans by sweeping the laser beam across the first scan plane 6 and the second scan plane 7. Alternatively, the scanner 4 could be kept permanently in operation so that it could detect the arrival of an object 3 at the working zone 62.

Assume that the optical code 10 is to be read from an object 3 having a different height than the objects previously read. It will then be necessary to activate the adjustment procedure effective to correctly position the focusing lens 142 relative to the laser source 5, so as to have the laser beam 51 focused exactly onto the optical code 10.

When the object 3, in its forward movement, intersects the scan plane 6, the scanner 4 makes a sampling. This sampling is intended for measuring the distance of the object 3 from the scanner 4. According to this measurement, the data processing unit 13 will control the movement of the focusing means 14, so as to correctly focus the laser beam 51 onto the object 3 being scanned and read the optical code 10 thereon.

Likewise, the laser beam can be correctly focused onto the surfaces of objects of varying height. In this case, as the object 3 is being moved along the feeding direction x, the scan plane 6 will intersect the object surface 3a at points located each time at a different distance from the scanner 4 than the points intercepted during previous samplings. According to the distance measured during the last sampling performed on the object 3 being scanned and the feeding speed of the conveyor belt 2, the data processing unit 13 will control the movement of the focusing means 14 so as to adjust the laser beam focusing in a substantially continuous way. Thus, any optical code on the object 3 can be read correctly even if the height of the object is not uniform.

The steps of distance measuring and reading the code 10 will now be described in detail with particular reference to FIGS. 2, 3a and 3b.

The modulated light laser beam 51 emitted from the laser source 5 hits the polygonal mirror-carrying rotor 11, and generates a plurality of scans in the scan plane 6 each time that the laser beam 51 hits the inclined mirror 20, and a plurality of scans in the scan plane 7 each time that the laser beam 51 hits one of the remaining mirrors 30, as the rotor 11 is rotated. Assuming a rotor with ten mirrors, the scanner will perform one scan in the plane 6 and nine scans in the plane 7 at each revolution.

When the object 3 reaches the working zone 62, it is intercepted by the scan in the scan plane 6. This scan will hit the object 3 and cause a scattered light beam to be thrown back which is then picked up by the scanner 4 and focused onto the photodiode 42 through the pick-up mirror 40 and the converging lens 41. The photodiode 42 generates an electric signal (typically, a current) which is proportional to the light intensity of the picked-up light beam. This signal is amplified and supplied to the data processing unit 13, specifically to the means 82 for measuring the distance of the object 3 from the scanner 4.

The way of measuring the distance is fully described in U.S. Pat. No. 5,483,051 of the same Applicant, and will not be repeated herein.

It is worth mentioning, however, that in order to make the measurement, the microprocessor 823 must be informed about which of the ten mirrors on the rotor 11 is to be considered for making the distance measurement. In fact, the measuring process being dependent on the laser modulation, it is active all the time, but only one (or more) specific mirror(s) will supply the correct information. This function can be performed effectively by supplying the microprocessor 823 with an appropriate pulse which is generated only before the laser beam 51 hits the distance measuring mirror 20, so that the microprocessor 823 can know that the signal from the mirror 20 which is then performing the scan is the one to be dedicated to distance measuring.

The distance value is thus determined prior to the object 3 moves into the working zone 72 dedicated for reading the code 10, since the scan plane 6 is set at an angle α of inclination with respect to the scan plane 7.

Typically, since the distance value may vary along the scan line 61, a mean value is used to best utilize the depth of field afforded by the scanner 4 around a focus setting value. Each focus setting, in fact, allows reading within a spatial range which is a function of the size of the smallest bar in the code 10 to be read. This range will be the wider, the larger is the size of the smallest bar in the code 10.

Based upon the value of the measured distance, the microprocessor 823 will control the actuator 141 to suitably shift the focusing lens 142 for exactly focusing the laser beam 51 onto the object 3.

When the object 3 intersects in its forward movement the scan plane 7, the scanner 4 will perform a plurality of scans for reading the optical code 10 on the object 3. In this situation, the laser beam 51 has already been correctly focused onto the object 3, and therefore, the return electric signal, which is proportional to the light beam scattered from the object 3 and picked up by the scanner 4, will be used, following its amplification through the amplifier 80, by the digitalizer 811 and supplied to the decoder 812 for its decoding.

The optical code 10 reading is performed conventionally, and for simplicity, will not be described again herein.

The signal from the encoder 15 is useful to gain information about the code-bearing object feeding speed, so that the focusing lens 142 can be shifted in good time by means of the actuator 141. This signal, however, is not strictly necessary to the application, the lens 142 being driven at the highest rate afforded by the system.

It can be appreciated from the foregoing description that, where a rotor of the type shown in FIG. 4 is employed, it should be provided a first laser source 5a capable of emitting a modulated light beam 51a to be focused, by means of a lens 142a, onto the upper mirrors 20 effective for generating distance measuring scans, and a second laser source 5b capable of emitting a beam 51b, not necessarily of modulated light, to be focused, by means of a lens 142b, on the lower mirrors 30 effective for generating the code reading scans. Such an arrangement would obviously require two different throw-back paths and two different amplifiers 80.

In summary, it should be noted that, where the scanner 4 is intended for reading high resolution (0.2 or 0.3 mm) codes, it is unnecessary for the distance measurement to be highly accurate, because the reading can be effected satisfactorily inside of about 150 mm with a resolution of 0.2 mm, and inside of 300 mm with a resolution of 0.3 mm. Accordingly, a modulated light measuring system capable of making measurements with cm approximation would be more than adequate for the purposes of this invention.

Furthermore, supposing that the actuator 141 will restore the lens 142, at the end of each reading step, to the best condition for reading from an object 3 placed at minimum distance, the operating condition would be optimal. In fact, supposing that the object 3 bearing the code 10 is moving at maximum distance for reading, the longest shifting time will be needed for the lens 142; in this condition, however, there also occurs the longest time interval between the moment when the distance is measured in the zone 62 and the moment when the code 10 is read in the zone 72. Thus, the lens 142 can be focused before the object enters the reading zone 72.

For clarity's sake, numerical examples of practical situations are reported herein below.

Suppose that the scanner 4 is to read a 0.3 mm code 10 with a depth of field of 1 m, e.g. within the range of 300 mm to 1300 mm, as is frequently the case. Assuming an inclination angle α of 6° and a rotor 11 with ten mirrors, of which one is set at a different angle of inclination, then the following values are obtained:

| DISTANCE mm | DELTA X mm | T1 ms | T2 ms |
|---|---|---|---|
| 300 | 31 | 31 | 16 |
| 600 | 63 | 63 | 32 |
| 900 | 94 | 94 | 47 |
| 1300 | 136 | 136 | 68 | where:

DELTA X is the gap between the zone 62 where the distance measuring scan is performed and the zone 72 where the code 10 reading scans are performed;

T1 is the time required, at a speed of 1 m/s of the conveyor belt 2, to move the object 3 from the measuring zone 62 into the reading zone 72;

T2 is the same time as above, but at a speed of 2 m/s of the conveyor belt 2.

Obviously, also the lens 142 focusing time is longer (since the lens has to complete a longer shifting) for the objects 3 located farther away, i.e. at 600, 900 and 1300 mm from the scanner 4. In this case, however, the objects 3 would take longer to reach the reading zone 72, and accordingly, the system will have sufficient time to settle on the correct focus setting.

Anyhow, even if the distance reading were to be taken every 10 ms, and the object were 600 mm away (the first object to require shifting, assuming a starting condition with the lens 142 focused for objects 300 mm away), it would still be possible to obtain, at the speed of 2 m/s, proper focusing since, even supposing a loss of 10 ms for distance reading in the most unfavorable of cases, for completing one revolution of the rotor 11, there would be left 21 ms for shifting the lens 142 (it should be reminded that a typical time duration for focusing the lens 142 lies between 15 ms and 20 ms, to obtain a full shifting of the slowest and least expensive systems, reducing to a few ms with more sophisticated systems.)

To fill varying demands (e.g., for higher resolution codes, wherein the depth of field at each step would be smaller), the angle α may be increased to grant a longer time, or the distance measurement be made with 2 mirrors out of 10, so that in the most unfavorable of cases, a loss of 2 scans out of 10 may or may not have to be taken into account. In this case, the time lost for knowing the distance would come down to 5 ms.

The invention as described hereinabove affords several advantages over the prior art, among which are the following.

possibility of suitably focusing the laser beam so as to perform a correct and optimized reading of even high resolution codes attached to objects of any shapes and heights;

possibility of obtaining, by successive steps corresponding to different focus adjustments, a high depth of field on very high resolution codes, and continuous focusing onto irregular surfaces;

possibility of obtaining, by successive steps corresponding to different focus adjustments, continuous focusing onto irregular surfaces;

possibility of knowing the distance of the bar code before the object enters the code reading area, which allows this focusing system to be also used for high speed applications;

possibility of activating the reading scans only after the laser beam is properly focused according to the measured distance value;

possibility of changing, according to the speed of the conveyor belt, the wait time before a useful measuring scan is produced, by varying the number of the distance measuring mirrors or increasing the inclination angle of the scan plane dedicated to the measurement.

What is claimed is:

1. A laser beam focusing apparatus for reading optical codes on objects carried on a supporting plane which is provided with a means for moving the objects along a feeding direction, comprising:

a laser beam scanner, which scanner is positioned relative to the object supporting plane so as to illuminate the object surface bearing the optical code;

a data processing unit connected to the scanner;

a first scan means for generating at least a first scan in a first scan plane, so as to measure only an instantaneous distance of at least one point on the surface of each of said objects from the scanner;

a second scan means for generating a plurality of second scans in a second scan plane, different from the first one, so as to read the optical code on the object; and a means for focusing the laser beam lying on the second scan plane according to the measured distance value.

2. An apparatus according to claim 1, wherein the laser beam scanner emits modulated light.

3. An apparatus according to claim 1, wherein the second scan plane is different from the first scan plane.

4. An apparatus according to claim 1, wherein the first scan plane intercepts the object in advance of the second scan plane, relative to the movement of the object on the supporting plane along the feeding direction.

5. An apparatus according to claim 1, wherein the first and second scan planes are inclined to each other at an angle of inclination within a range of 2° to 20°.

6. An apparatus according to claim 5, wherein the inclination angle between the scan planes is approximately 6°.

7. An apparatus according to claim 1, wherein the first scan means is activated in advance of the second scan means.

8. An apparatus according to claim 1, comprising a polygonal mirror-carrying rotor, wherein the first scan means comprises some (m) of the rotor mirrors and the second scan means comprises the remaining (n-m) rotor mirrors, said some of the rotor mirrors having a different inclination angle from the rotor axis than that of said remaining rotor mirrors.

9. An apparatus according to claim 8, wherein said some of the rotor mirrors are a single mirror.

10. An apparatus according to claim 1, comprising a polygonal mirror-carrying rotor, wherein the first scan means comprises a plurality of first rotor mirrors mounted around a first peripheral portion of the rotor, and the second scan means comprises a plurality of second rotor mirrors mounted around a second peripheral portion of the rotor adjacent to said first peripheral portion, the mirrors of said plurality of first mirrors having a different inclination angle from the rotor axis than that of the mirrors of said plurality of second mirrors.

11. An apparatus according to claim 1, comprising an oscillating mirror having an oscillation plane movable between two different positions.

12. An apparatus according to claim 1, comprising a modulated light laser source housed within the scanner and oscillating in a movable plane between two different positions.

13. A process for focusing a laser beam for reading optical codes on objects which are carried on a supporting plane provided with a means for moving the objects along a feeding direction, comprising the following steps:

a) defining a first scan plane intersecting the supporting plane along a first scan line, said first plane comprising at least one laser beam;

b) defining a second scan plane, different from the first scan plane, intersecting the supporting plane along a second scan line, said second plane comprising at least one laser beam;

c) performing at least a first scan across the surface of one of said objects by means of the laser beam lying on the first scan plane for measuring only an instantaneous distance of at least one point on the surface of said object from a scanner emitting said laser beams;

d) processing the data provided by said first scan and calculating the measured distance value; and e) focusing the laser beam lying on the second scan plane according to the calculated distance value.

14. A process according to claim 13, wherein the laser beam laying on the first scan plane is a modulated light laser beam.

15. A process according to claim 13, further comprising the following steps:

f) performing a plurality of scans across the object by means of the laser beam lying on the second scan plane;

g) processing the data provided by said plurality of scans so as to read the optical code.

16. A process according to claim 13, wherein the first scan plane intercepts the object in advance of the second scan plane, relative to the movement of the object on the supporting plane along the feeding direction.

17. A process according to claim 16, wherein the inclination angle between the scan planes is approximately 6°.

18. A process according to claim 13, wherein the first and second scan planes are inclined to each other at an angle of inclination within an range of 2° to 20°.

19. A process according to claim 13, wherein said first and second scans are performed by means of a single polygonal mirror-carrying rotor, wherein the first scan means comprises some (m) of the rotor mirrors, and wherein the second scan means comprises the remaining (n-m) rotor mirrors, said some of the rotor mirrors having a different inclination angle from the rotor axis than that of said remaining rotor mirrors.

20. A process according to claim 13, wherein said first and second scans are performed by means of a single polygonal mirror-carrying rotor, wherein the first scan means comprises a plurality of first rotor mirrors mounted around a first peripheral portion of the rotor, and wherein the second scan means comprises a plurality of second rotor mirrors mounted around a second peripheral portion of the rotor adjacent to said first peripheral portion, the mirrors of said plurality of first mirrors having a different inclination angle from the rotor axis than that of the mirrors of said plurality of second mirrors.

21. A process according to claim 20, wherein said some of the rotor mirrors are a single mirror.

22. A process according to claim 13, wherein said first and second scans are performed by means of an oscillating mirror having an oscillation plane movable between two different positions.

23. A process according to claim 13, wherein said first and second scans are performed by means of a laser source housed within the scanner and oscillating in a movable plane between two different positions.

* * * * *